United States Patent
Lym et al.

(10) Patent No.: US 7,561,576 B2
(45) Date of Patent: *Jul. 14, 2009

(54) APPARATUS FOR AND METHOD OF PREDICTIVE TIME STAMPING OF ISOCHRONOUS DATA PACKETS TRANSMITTED OVER AN IEEE 1394-1995 SERIAL BUS NETWORK

(75) Inventors: Kevin K. Lym, Alameda, CA (US); Hisato Shima, Saratoga, CA (US); Quan Vu, Milpitas, CA (US)

(73) Assignees: Sony Corporaiton, Tokyo (JP); Sony Electronics Inc., Park Ridge, NJ (US)

( * ) Notice: Subject to any disclaimer, the term of this patent is extended or adjusted under 35 U.S.C. 154(b) by 697 days.

This patent is subject to a terminal disclaimer.

(21) Appl. No.: 11/230,941

(22) Filed: Sep. 19, 2005

(65) Prior Publication Data
US 2006/0013223 A1    Jan. 19, 2006

Related U.S. Application Data

(63) Continuation of application No. 10/735,338, filed on Dec. 12, 2003, now Pat. No. 6,973,087, which is a continuation of application No. 09/037,397, filed on Mar. 9, 1998, now Pat. No. 6,680,944.

(51) Int. Cl.
*H04L 12/28* (2006.01)
(52) U.S. Cl. ................. 370/394; 370/473; 370/505
(58) Field of Classification Search ........ 370/394, 370/473, 505, 389, 395.1, 470, 471, 476, 370/474, 462, 428, 503, 252; 348/500, 510; 709/232, 249, 250, 238; 710/20, 108, 107
See application file for complete search history.

(56) References Cited

U.S. PATENT DOCUMENTS 4,894,823 A    1/1990    Adelmann et al. ........... 370/60

(Continued)

FOREIGN PATENT DOCUMENTS

EP    0 895 378 A1    3/1999

OTHER PUBLICATIONS

Michael Teener et al., "A Bus on a Diet—The Serial Bus Alternative. An Introduction to the P1394 High Performance Serial Bus." p. 316-321, Jan. 24, 1992, Doc. No. XP 000340753, IEEE.
R.H.J. Bloks, "The IEEE-1394 High Speed Serial Bus," pp. 209-216, Doc. No. XP 000627671, Philips Journal of Research, vol. 50, No. 1/2, 1996.
IEC, "61883-1998 Standard for Digital Interface for Consumer Audio/Video Equipment," Parts 1-5, Edition 1.0, Feb. 1998.

*Primary Examiner*—Chi H Pham
*Assistant Examiner*—Alexander Boakye
(74) *Attorney, Agent, or Firm*—Haverstock & Owens LLP

(57) ABSTRACT

In order to predictively time stamp isochronous data packets transmitted over an IEEE 1394-1995 serial bus network, an application, which is to send a stream of isochronous data packets to a receiving node, first transmits a number of dummy frames each consisting of a number of packets. Preferably, these isochronous data packets make up frames of video data. From these dummy packets, the application obtains the time stamp values within the common isochronous packet (CIP) header of each packet. Using these obtained time stamp values, the application calculates a presentation time value for each data frame to be transmitted. The obtained time stamp value from a transmitted video frame is used to calculate the presentation time for a video frame which is a number of frames ahead within the transmit queue. Once the presentation time value for a frame is calculated, that value is then inserted by the application into the CIP header for the first packet within that frame and the frame is sent to the transmit queue for transmission to the receiving node over the IEEE 1394-1995 serial bus network.

20 Claims, 6 Drawing Sheets

U.S. PATENT DOCUMENTS

| | | | |
|---|---|---|---|
| 5,052,029 A | 9/1991 | James et al. | 375/107 |
| 5,400,340 A | 3/1995 | Hillman et al. | 370/105.3 |
| 5,412,698 A | 5/1995 | Van Brunt et al. | 375/373 |
| 5,434,860 A | 7/1995 | Riddle | 370/84 |
| 5,444,709 A | 8/1995 | Riddle | 370/94.1 |
| 5,481,543 A | 1/1996 | Veltman | 370/94.1 |
| 5,493,570 A | 2/1996 | Hillman et al. | 370/105.3 |
| 5,561,670 A | 10/1996 | Hoffert et al. | 370/94.1 |
| 5,596,581 A | 1/1997 | Saejis et al. | 370/394 |
| 5,625,405 A | 4/1997 | DuLac et al. | 348/7 |
| 5,781,599 A | 7/1998 | Shiga | 375/376 |
| 5,859,835 A | 1/1999 | Varma et al. | 370/229 |
| 5,860,060 A | 1/1999 | Li et al. | 704/500 |
| 5,933,430 A | 8/1999 | Osakabe et al. | 370/395 |
| 5,991,307 A | 11/1999 | Komuro et al. | 370/473 |
| 6,172,989 B1 | 1/2001 | Yanagihara et al. | 370/473 |
| 6,373,821 B2 | 4/2002 | Staats | 370/252 |
| 6,477,181 B1 | 11/2002 | Fujimori et al. | 370/476 |
| 6,680,944 B1 * | 1/2004 | Lym et al. | 370/394 |
| 6,973,087 B2 | 12/2005 | Lym et al. | 370/394 |

* cited by examiner

| data length | | 01 | channel | tCode | sy |
|---|---|---|---|---|---|
| header_CRC |||||||
| | sourceID | | other CIP header fields |||
| other CIP header fields ||||||
| remaining data field ||||||
| data_CRC ||||||

Fig. 3

| 0 | 0 | SID | DBS | FN | QPC | SPH | RSV | DBC |
|---|---|-----|-----|----|----|-----|-----|-----|
| 1 | 0 | FMT | FDF | SYT | | | | |

Fig. 4

APPARATUS FOR AND METHOD OF PREDICTIVE TIME STAMPING OF ISOCHRONOUS DATA PACKETS TRANSMITTED OVER AN IEEE 1394-1995 SERIAL BUS NETWORK

This Patent Application is a continuation of U.S. patent application Ser. No. 10/735,338, filed on Dec. 12, 2003 now U.S. Pat. No. 6,973,087, which is a continuation of U.S. patent application Ser. No. 09/037,397, filed Mar. 9, 1998, now issued as U.S. Pat. No. 6,680,944, the contents of which are hereby incorporated by reference.

FIELD OF THE INVENTION

The present invention relates to the field of transmitting information between devices. More particularly, the present invention relates to the field of transmitting time sensitive information between devices over an IEEE 1394-1995 serial bus network.

BACKGROUND OF THE INVENTION

The IEEE 1394-1995 standard, "1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple channels for isochronous data transfer between applications. A six bit channel number is broadcast with the data to ensure reception by the appropriate application. This allows multiple applications to concurrently transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394-1995 cable environment is a network of nodes connected by point-to-point links, including a port on each node's physical connection and the cable between them. The physical topology for the cable environment of an IEEE 1394-1995 serial bus is a non-cyclic network of multiple ports, with finite branches. The primary restriction on the cable environment is that nodes must be connected together without forming any closed loops.

The IEEE 1394-1995 cables connect ports together on different nodes. Each port includes terminators, transceivers and simple logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394-1995 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

When transmitting isochronous data between two devices, each packet of isochronous data is time-stamped with the current bus time of the cycle in which the packet is transmitted. If not received by the receiving device in the correct cycle, the packet is typically discarded by the receiving device and the data is lost. This is especially true when transmitting video data which is very time sensitive. When transmitting frames of video data, the first packet of the received frames of data have to be received within a recognized boundary of time as compared to the time stamp value of the packet. If the first packet of the frame is received outside of this boundary, the entire frame is generally discarded and not processed by the receiving device.

The value of this time stamp is acquired from the cycle time register, within the transmitting device, which maintains the current bus time for a node. The cycle time register includes a second_count field and a cycle_count field which together form a value representing the current cycle. This cycle value is incremented on each carry from a cycle_offset field. The cycle_offset field is updated on each transition of the system clock. On the transition after the value within the cycle_offset field is equal to 3071, the value within this field wraps around to zero and the value within the cycle_count field is incremented. The value within the cycle offset field is a fractional part of the current isochronous cycle. When transmitting data from an application within the node, the application must obtain the current bus time from the cycle time register, then load the current bus time value into the packet and transmit the packet over the IEEE 1394-1995 serial bus to the receiving node. Within the transmitting node, there can be a substantial delay between the time in which the current bus time value is sent from the cycle time register and the time at which the application receives the current bus time value from the cycle time register, inserts it into the packet and actually transmits the packet over the IEEE 1394-1995 serial bus network. If this delay is significant, the current bus time value received by the application may be obsolete and outside of the appropriate boundary of time, by the time the packet is actually transmitted, causing the transmitted packets to be discarded by the receiving device.

What is needed is a method of and apparatus for ensuring that transmitted packets will be received by the receiving device within the appropriate boundary of time in-order that the packets are properly processed by the receiving device and not discarded. What is further needed is a method of and apparatus for predicting the current bus time value corresponding to the actual transmission of isochronous packets from a node on an IEEE 1394-1995 serial bus.

SUMMARY OF THE INVENTION

In order to predictively time stamp isochronous data packets transmitted over an IEEE 1394-1995 serial bus network, an application, which is to send a stream of isochronous data packets to a receiving node, first transmits a number of dummy frames each consisting of a number of packets. Preferably, these isochronous data packets make up frames of video data. From these dummy packets, the application obtains the time stamp values within the common isochronous packet (CIP) header of each packet. Using these obtained time stamp values, the application calculates a presentation time value for each data frame to be transmitted. The obtained time stamp value from a transmitted video frame is used to calculate the presentation time for a video frame which is a number of frames ahead within the transmit queue. Once the presentation time value for a frame is calculated, that value is then inserted by the application into the CIP header for the first packet within that frame and the frame is sent to the transmit queue for transmission to the receiving node over the IEEE 1394-1995 serial bus network.

BRIEF DESCRIPTION OF THE DRAWINGS

FIG. 3 illustrates a format of an isochronous data packet for transmission over an IEEE 1394-1995 serial bus network.

FIG. 4 illustrates a format of a CIP header field within an isochronous data packet.

DETAILED DESCRIPTION OF THE PREFERRED EMBODIMENT

Figure 1:
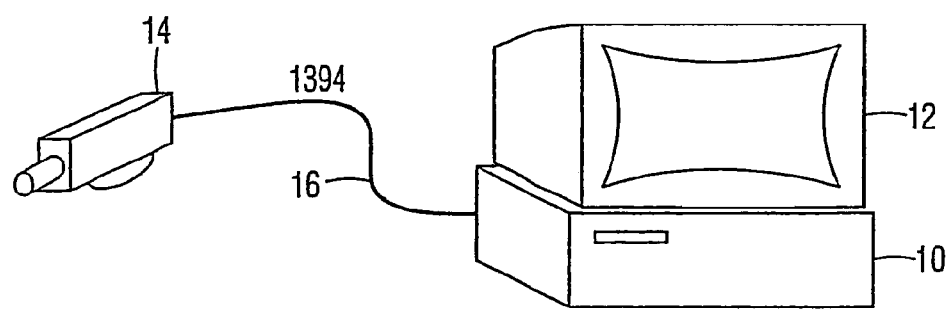
FIG. 1 illustrates a block diagram of an IEEE 1394-1995 serial bus network including a computer system and a video camera.

A block diagram of an exemplary IEEE 1394-1995 serial bus network including a computer system and a video camera is illustrated in FIG. 1. The computer system 10 includes an associated display 12 and is coupled to the video camera 14 by the IEEE 1394-1995 serial bus cable 16. Video data and associated data are sent between the video camera 14 and the computer 10 over the IEEE 1394-1995 serial bus cable 16.

Figure 2:
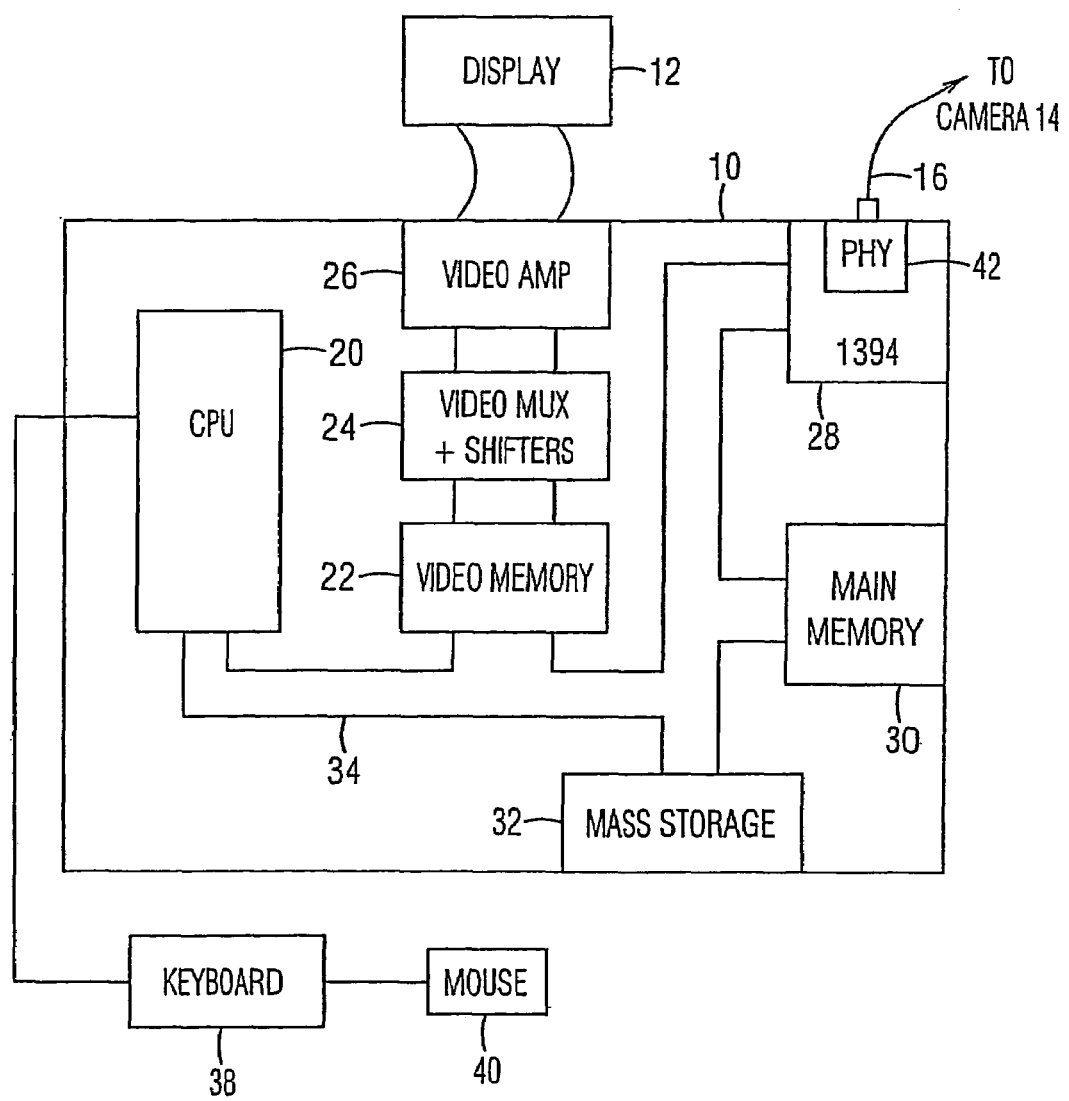
FIG. 2 illustrates a block diagram of the internal components of the computer system 10.

A block diagram of the internal components of the computer system 14 is illustrated in FIG. 2. The computer system 10 includes a central processor unit (CPU) 20, a main memory 30, a video memory 22, a mass storage device 32 and an IEEE 1394-1995 interface circuit 28, all coupled together by a conventional bidirectional system bus 34. The interface circuit 28 includes the physical interface circuit 42 for sending and receiving communications on the IEEE 1394-1995 serial bus. The physical interface circuit 42 is coupled to the camera 14 over the IEEE 1394-1995 serial bus cable 16. In the preferred embodiment of the present invention, the interface circuit 28 is implemented on an IEEE 1394-1995 interface card within the computer system 10. However, it should be apparent to those skilled in the art that the interface circuit 28 can be implemented within the computer system 10 in any other appropriate manner, including building the interface circuit onto the motherboard itself. The mass storage device 32 may include both fixed and removable media using any one or more of magnetic, optical or magneto-optical storage technology or any other available mass storage technology. The system bus 34 contains an address bus for addressing any portion of the memory 22 and 30. The system bus 34 also includes a data bus for transferring data between and among the CPU 20, the main memory 30, the video memory 22, the mass-storage device 32 and the interface circuit 28.

The computer system 10 is also coupled to a number of peripheral input and output devices including the keyboard 38, the mouse 40 and the associated display 12. The keyboard 38 is coupled to the CPU 20 for allowing a user to input data and control commands into the computer system 10. A conventional mouse 40 is coupled to the keyboard 38 for manipulating graphic images on the display 12 as a cursor control device.

A port of the video memory 22 is coupled to a video multiplex and shifter circuit 24, which in turn is coupled to a video amplifier 26. The video amplifier 26 drives the display 12. The video multiplex and shifter circuitry 24 and the video amplifier 26 convert pixel data stored in the video memory 22 to raster signals suitable for use by the display 12.

A format of an isochronous data packet for transmission over an IEEE 1394-1995 serial bus network is illustrated in FIG. 3. The format of the data packet also complies with the IEC 1883 standard. The data_length field contains a value representing the number of bytes of data within the data field, including the number of bytes within the CIP header. The channel field contains the channel number on which the isochronous packet is transmitted. The tCode field contains the transaction code for the packet. For isochronous data packets, the tCode field contains either a value of Ah or Ch. The sy field contains a synchronization flag used in some applications to synchronize the data in the current isochronous packet with some application specific event. The sourceID field contains a six bit value representing the physical identifying code of the node which is transmitting the packet. The values in the other CIP header fields depend on the format of the data being transmitted in the packet. The data field, if present, contains the content data being transmitted in the packet.

Figure 4:
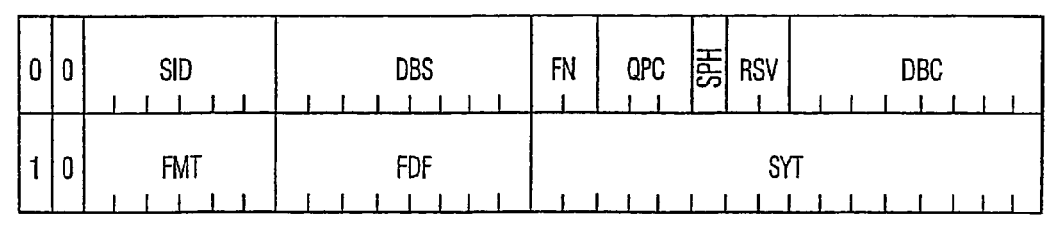

A format of the CIP header within an isochronous data packet is illustrated in FIG. 4. Within the CIP header, the SID field contains the source node ID value of the transmitting node. The DBS field contains a value representing the size of the data block in quadlets. The FN field contains a fraction number representing the number of data blocks into which a source packet is divided. The QPC field contains a value representing the number of dummy quadlets added to a source packet to equalize the size of the divided data blocks. If the FN field indicates that the source packet is not divided, then the QPC field will contain a value equal to zero. The SPH flag represents whether or not the source packet includes a source packet header. The SPH flag is set equal to a logical "one" when the source packet does include a source packet header. The rsv field is reserved for future extension. The DBC field is the continuity counter of data blocks to detect a loss of data blocks. The FMT field includes a format identifier which identifies the format of the packet. The FDF field is a format dependent field and depends on the format of the packet. The SYT field is used to synchronize the transmitter and the receiver.

When transmitting isochronous data over an IEEE 1394-1995 serial bus network, the SYT field includes a time stamp value for the presentation time of the frame. The receiving node uses this time stamp value to ensure that the data is presented within the correct boundary of time for video data. As discussed above, if the frame does not fall within the correct boundary of time, the receiving device will discard the entire frame.

In order to ensure that the transmitted data includes the appropriate time stamp value, the application of the present invention calculates the time stamp value by first sending a number of dummy data frames. A data frame consists of a number of isochronous packets. The number of isochronous packets per frame is dependent upon the type of data being sent. In terms of video, a data frame can be a single frame of digital video. After the first data frame is sent, a time stamp of the last packet sent of the first frame is obtained. From this value, a new time stamp value or presentation time is calculated for the first packet of a video frame which is a number of frames ahead of the frame from which the time stamp value was obtained. In the preferred embodiment of the present invention, the presentation time is calculated for a video frame which is four frames, or one less than the preferred number of dummy frames, ahead of the frame from which the time stamp value was obtained. Once calculated, this presentation time value is written into the SYT field of the CIP header of the first packet within the appropriate data frame and sent to the transmit queue for transmission over the IEEE 1394-1995 serial bus to the receiving node.

Figure 5:
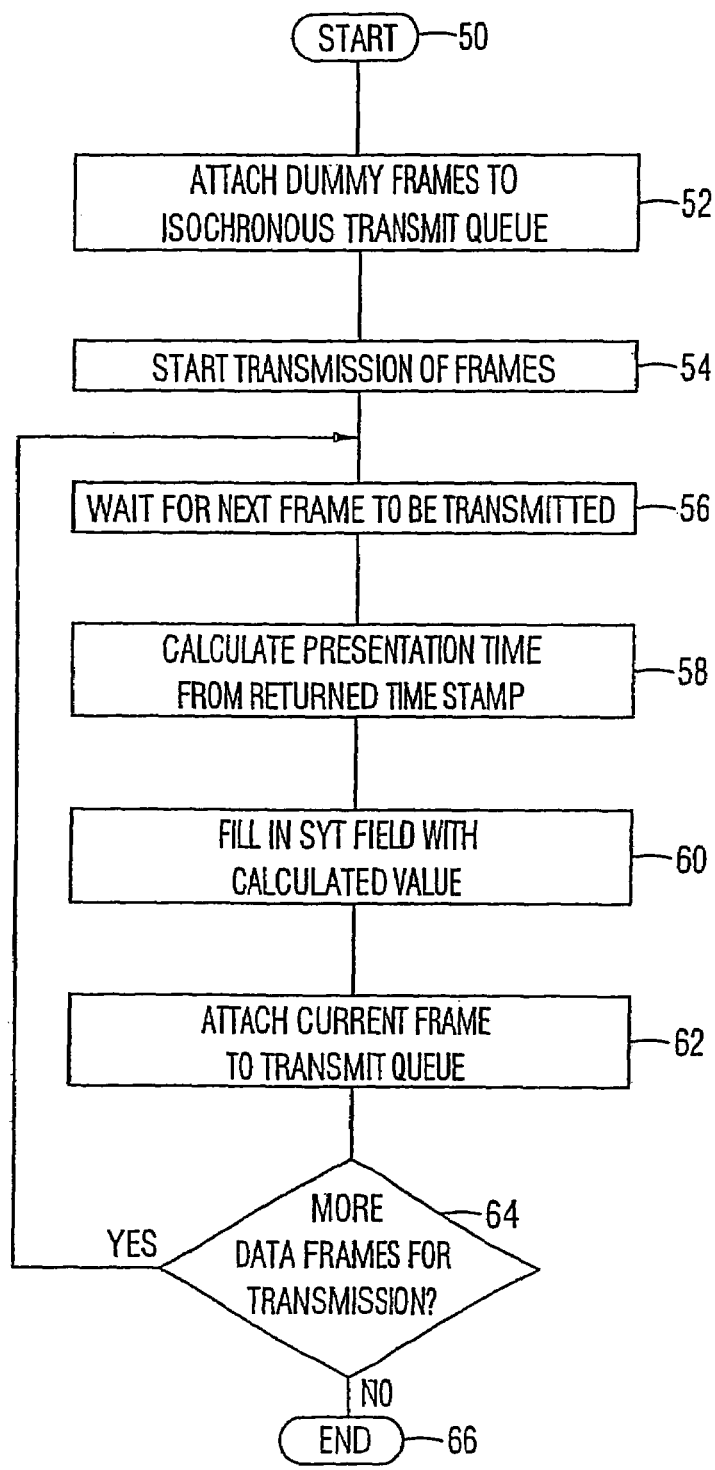
FIG. 5 illustrates a flow diagram of the steps involved in predictively time stamping isochronous data frames according to the preferred embodiment of the present invention.

A flow diagram of the steps involved in predictively time stamping isochronous data frames according to the preferred embodiment of the present invention, is illustrated in FIG. 5. The flow chart is entered at the step 50, when an application within the computer 10 is preparing to transmit a stream of isochronous data to the video camera 14. At the step 52, the application attaches the dummy data frames to the isochronous transmit queue. Each dummy data frame consists of a number of dummy IEEE 1394-1995 isochronous packets. The number of dummy packets per data frame is determined by the type of data being sent. At the step 54, the application starts to transmit the dummy frames from the computer 10, over the IEEE 1394-1995 serial bus network 16 to the video camera 14. In the preferred embodiment of the present invention five dummy data frames are sent before actual data frames containing actual video data are transmitted to the receiving device. Alternatively, any appropriate number of dummy data frames can be transmitted by the application. At the step 56, the application waits until it receives notification that a dummy data frame has been sent.

After the first data frame is sent, the application obtains the time stamp value of the last packet in this data frame from the IEEE 1394-1995 interface circuit. From this time stamp value, the presentation time for the first real packet within the first actual data frame is calculated at the step 58. The first actual data frame will be the sixth frame to be sent and will be transmitted after the five dummy data frames. This presentation time value is calculated using the following equation:

$$PresentationTime = \\ ((\text{\# of Dummy Frames} - 1) * DataFrameXmtTimeLength) + \\ TimeStamp + PresentationTimeFactor$$

The DataFrameXmtTimeLength value represents the time length of each data frame that is transmitted and is calculated by multiplying the number of isochronous packets per data frame by the isochronous transmission time per packet. The isochronous transmission time per packet is a fixed value per packet as described in the IEEE 1394-1995 specification. The DataFrameXmtTimeLength value is multiplied by a value equal to one less than the number of dummy data frames being sent, in order to add an appropriate time value representing the number of transmitted frames between the frame from which the time stamp value was obtained and the frame for which the presentation time is being calculated. The TimeStamp value is the time stamp value retrieved from the transmission of a previous packet within a data frame. For the first actual video frame, the TimeStamp value is equal to the cycle time of the last isochronous packet sent in the first dummy frame. Within the preferred embodiment of the present invention, only the cycle count value from the cycle time of the last isochronous packet sent in the first dummy frame is used as the TimeStamp value. The cycle offset value within the cycle time of the last isochronous packet sent in the first dummy frame is not used because only the cycle that the packet is sent is needed to calculate the presentation time of the packet. The offset time within the cycle is not necessary to calculate the presentation time. It should however be apparent to those skilled in the art that the value of the entire cycle time could alternately be used as the TimeStamp value. The PresentationTimeFactor is a factor in units of isochronous cycles which is used to change the time stamp value into an appropriate presentation time. The value of the PresentationTimeFactor is dependent on the specific implementation and will vary due to system implementation and performance characteristics. The PresentationTimeFactor value is composed of two components and is calculated using the following equation:

$$PresentationTimeFactor = tdiff + TransmissionDelayLimit$$

The tdiff value represents the difference between the actual cycle time when a packet is transmitted and the cycle time that the hardware actually reports that the packet has been transmitted. The delay between the actual cycle time when a packet is transmitted and the cycle time that the hardware actually reports that the packet has been transmitted is determined by the specific hardware implementation. If the hardware supports returning the actual time that the packet was transmitted, then the tdiff value is equal to zero. The TransmissionDelayLimit value is equal to the maximum number of cycles allowed for a packet to be transmitted by the audio/video device. This value is described in the "Specifications of Consumer-Use Digital VCRs" for specific hardware devices. Preferably, this value is equal to 450 microseconds or three cycles.

Once the presentation time is calculated for a data frame, this data frame can be time stamped. At the step 60, the presentation time value is written into the SYT field of the first isochronous data packet contained within the data frame. At the step 62 the data frame is then attached to the transmit queue for transmission over the IEEE 1394-1995 serial bus network. It is then determined, at the step 64, if there are more data frames within this stream of data to be transmitted. If there are more data frames to be transmitted, steps 56 through 62 are repeated for each frame to be transmitted in order to calculate an appropriate presentation time value for each frame from an obtained time stamp value from the transmitted frame which is four frames before the frame for which the presentation time value is being calculated. Once all frames are appropriately time stamped and attached to the transmit queue, the operation is finished at the step 66.

Figure 6:
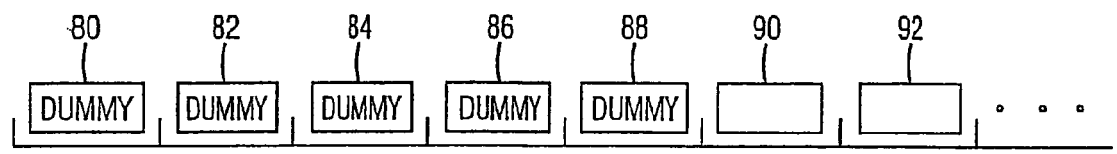
FIG. 6 illustrates the transmission of a stream of isochronous video frames including a number of dummy frames preceding the actual video frames.

The transmission of a stream of isochronous frames including a number of dummy frames preceding the actual video frames is illustrated in FIG. 6. The five dummy frames 80, 82, 84, 86 and 88 are transmitted successively before the actual video frames 90 and 92. From the five dummy frames 80, 82, 84, 86 and 88, the application calculates the presentation time values for the actual video frames within the data stream. As described in detail above, the presentation time value for the actual frame 90 is calculated using the time stamp value obtained from the first dummy frame 80. Correspondingly, the presentation time value for the second actual frame 92 is calculated using the time stamp value obtained from the second dummy frame 82. Once the presentation time value for a frame is calculated, this presentation time value is written into the SYT field of the CIP header of the first packet within the frame. The remaining packets within the frame are timestamped in a conventional manner with the current bus time of the cycle in which the frame is transmitted. Once the presentation time value for a frame is calculated and written into the SYT field of the CIP header, the frame is then added to the transmitting node's transmit queue for transmission over the IEEE 1394-1995 serial bus to the receiving node at the appropriate time.

This process is repeated for each data frame in the stream of data until all of the data frames within the stream of data have been transmitted from the computer 10 to the video camera 14. In this manner, by calculating the appropriate time stamp value for a frame and inserting that value into the SYT field of the CIP header of the first packet within the frame, the application ensures that when received by the video camera 14, the frames of video data will be properly processed and not discarded.

The preferred embodiment of the present invention is used to transmit isochronous data over an IEEE 1394-1995 serial bus network from a software application within a personal computer 10 to a video camera 14. However, it should be apparent to those skilled in the art that the present invention can be used to transmit time sensitive data frames and packets between any two appropriately configured applications and/or devices in order to ensure that when received, the time stamp value is appropriate for the cycle in which the frame or packet of data is transmitted. Within the preferred embodiment of the present invention, the time stamp value for an entire frame is calculated and written into the first packet of the frame. It should be apparent to those skilled in the art that the present invention can also be used to appropriately time stamp multiple individual packets whether or not they are part of a video frame.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of transmitting data over a network, comprising:
   a. transmitting a frame of data from a first node to a second node;
   b. timestamping the frame of data with a time stamp value at the second node;
   c. determining if the time stamp value is within a correct boundary time for video data;
   d. processing the frame of data within the correct boundary of time for video data; and
   e. discarding the frame of data not within the correct boundary of time for video data.

2. The apparatus of claim 1 further comprising calculating the time stamp value using a time stamp value from a previously transmitted frame which is a number of frames before the frames transmitted to the second node.

3. The apparatus of claim 2 wherein the step of calculating the time stamp value is completed by adding a value representing a time for transmission of the number of packets between the previously transmitted packet and the packet to be transmitted to the time stamp value from the previously transmitted packet.

4. The apparatus of claim 3 wherein the time stamp value is inserted into an SYT field within a CIP header of a first packet of the frame to be transmitted.

5. The apparatus of claim 1 wherein the data is isochronous data.

6. The apparatus of claim 1 wherein the network comprises an IEEE 1394 serial bus network.

7. A network of devices comprising:
   a. a serial bus network;
   b. a video camera coupled to the serial bus network; and
   c. a computer coupled to the serial bus network, the computer comprising:
      i. a memory to store an application for transmitting data from the computer to the video camera over the serial bus network; and
      ii. a processor coupled to the memory to execute the application, the application for obtaining a time stamp value from a previous packet, calculating a time value for a packet to be transmitted a number of packets after the previous packet using the obtained time stamp value and inserting the time value into the packet to be transmitted before the packet to be transmitted is transmitted.

8. The apparatus of claim 7 wherein the time value is a presentation value and is calculated by adding a value representing a time for transmission of the number of packets between the previous packet and the packet to be transmitted to the obtained time stamp value.

9. The apparatus of claim 7 wherein the packets are grouped into one or more frames.

10. The apparatus of claim 9 wherein the application only calculates the time value for a first packet of each frame.

11. The apparatus of claim 7 wherein the data is isochronous data.

12. The apparatus of claim 7 wherein the apparatus transmits data in accordance with an IEEE 1394 standard and the serial bus network comprises an IEEE 1394 serial bus network.

13. The apparatus of claim 12 wherein the time value is inserted into an SYT field within a CIP header of the packet to be transmitted.

14. An apparatus for transmitting data over a network, the apparatus comprising:

a. a memory to store an application; and b. a processor coupled to the memory to execute the application, the application for obtaining a time stamp value from a previous packet, calculating a time value for a packet to be transmitted a number of packets after the previous packet using the obtained time stamp value and inserting the time value into the packet to be transmitted before the packet to be transmitted is transmitted.

15. The apparatus of claim 14 wherein the time value is a presentation value and is calculated by adding a value representing a time for transmission of the number of packets between the previous packet and the packet to be transmitted to the obtained time stamp value.

16. The apparatus of claim 14 wherein the packets are grouped into one or more frames.

17. The apparatus of claim 16 wherein the application only calculates the time value for a first packet of each frame.

18. The apparatus of claim 14 wherein the data is isochronous data.

19. The apparatus of claim 14 wherein the apparatus transmits data in accordance with an IEEE 1394 standard.

20. The apparatus of claim 19 wherein the time value is inserted into an SYT field within a CIP header of the packet to be transmitted.

* * * * *